United States Patent [19]
Yanagawa et al.

[11] Patent Number: 5,555,538
[45] Date of Patent: Sep. 10, 1996

[54] OPTICAL PICKUP

[75] Inventors: Naoharu Yanagawa; Fumihiko Sano, both of Tokorozawa, Japan

[73] Assignee: Pioneer Electronic Corporation, Tokyo, Japan

[21] Appl. No.: 399,099

[22] Filed: Mar. 3, 1995

[30] Foreign Application Priority Data

Mar. 11, 1994 [JP] Japan .................................. 6-41585

[51] Int. Cl.$^6$ .................................................. G11B 7/00
[52] U.S. Cl. .......................................... 369/110; 369/112
[58] Field of Search ................................ 369/110, 109, 369/112, 13, 44.23, 44.24, 121; 359/496, 485

[56] References Cited

U.S. PATENT DOCUMENTS 5,115,420  5/1992  Finkelstein et al. ................ 369/112

*Primary Examiner*—Nabil Hindi
*Attorney, Agent, or Firm*—Kane, Dalsimer, Sullivan, Kurucz, Levy, Eisele and Richard, LLP

[57] ABSTRACT

An optical pickup includes: a laser diode for emitting p-polarized light, the laser diode having unit for controlling output power of the p-polarized light by detecting power of the emitted light in front thereof; a photodetector for receiving a laser light and outputting a signal corresponding to quantity of the laser light received; a polarization prism for transmitting and guiding the emitted light to an optical disc on which information is recorded by applying heat thereon, and for reflecting and guiding at least a portion of the light reflected by the optical disc to the photodetector. The optical pickup substantially satisfies the following conditions:

60 [%]≤Tp≤90 [%],

14 [%]≤Rs [%],

Rp=100–Tp [%], and

Ts=100–Rs, wherein p-polarized light transmittance of the polarization prism is Tp [%], s-polarized light transmittance of the polarization prism is Ts [%], p-polarized light reflectance of the polarization prism is Rp [%] and s-polarized light reflectance of the polarization prism is Rs [%].

4 Claims, 10 Drawing Sheets

OPTICAL PICKUP

BACKGROUND OF THE INVENTION

1. Field of the Invention

This invention relates to an information reproducing apparatus, and more particularly to an optical pickup for reproducing recorded information from an optical disc on which information is recorded by applying heat thereon.

2. Description of the Prior Art

Figure 1:
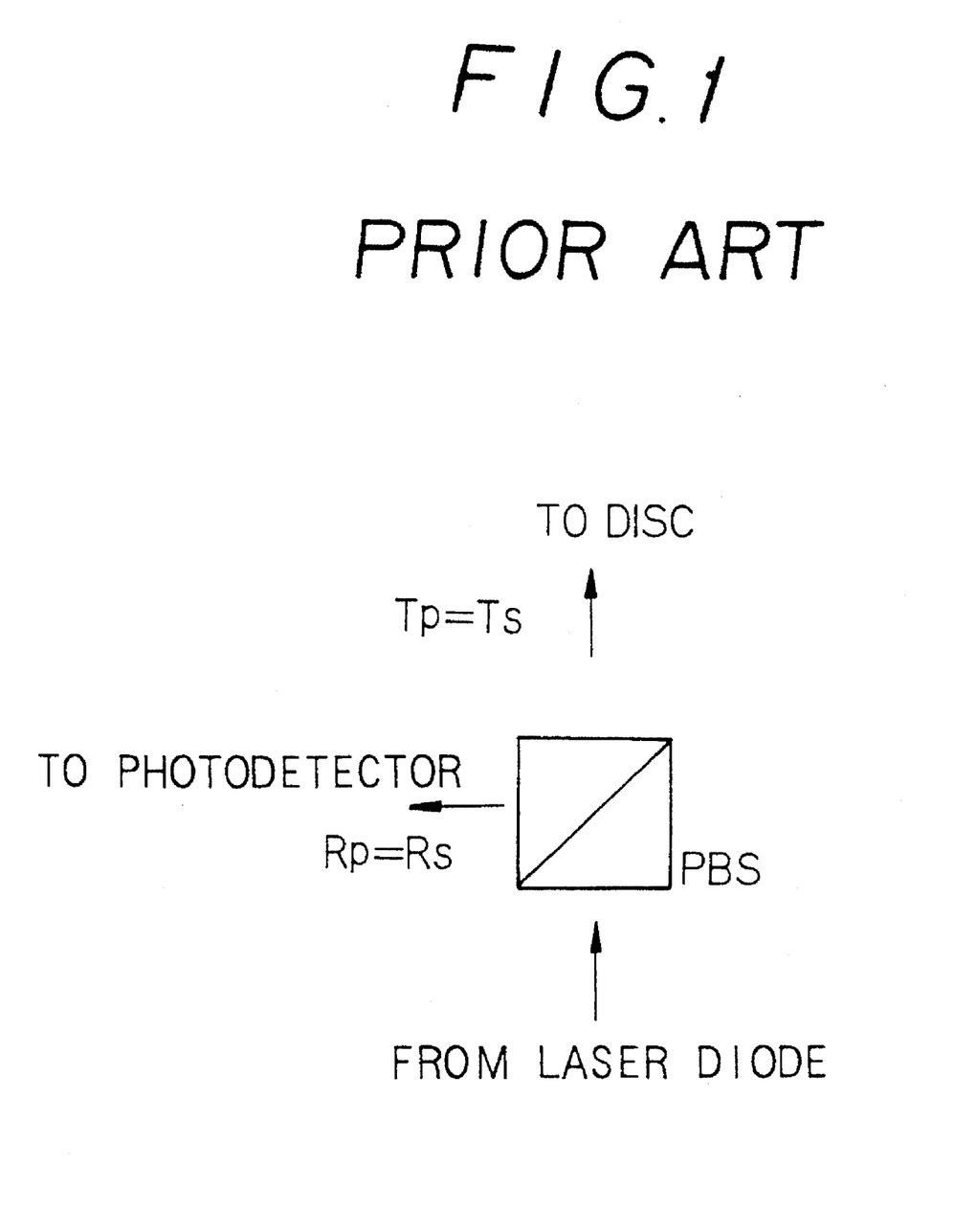
FIG. 1 is a diagram illustrating an operation of optical pickup utilizing non-polarized optical system.

There are known optical pickups utilizing non-polarizing optical system and completely polarizing optical system. An optical system of optical pickup utilizing non-polarizing optical system is shown in FIG. 1. An optical pickup utilizing non-polarizing optical system generally satisfies the following conditions:

Tp=Ts,

Rp=Rs, and

Tp=100–Rp [%](Ts=100–Rs [%]), wherein Tp [%] represents transmittance of polarization prism for p-polarized light, Ts [%] represents transmittance of polarization prism for s-polarized light, Rp [%] represents reflectance of polarization prism for p-polarized light, and Rs [%] represents reflectance of polarization prism for s-polarized light.

Figure 2A:
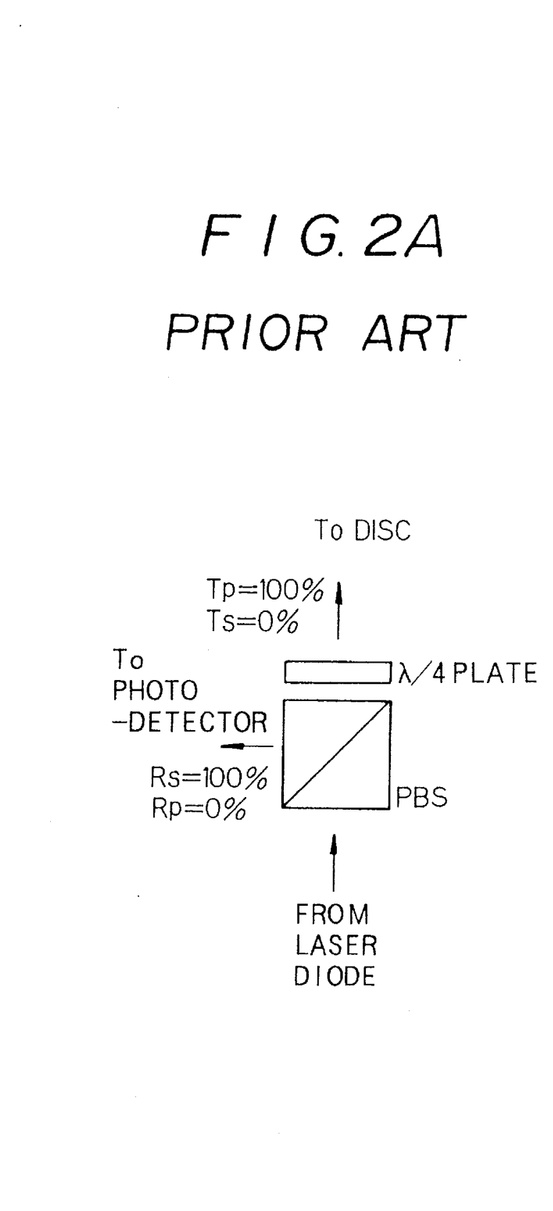
FIGS. 2A and 2B are diagrams illustrating operations of optical pickup utilizing completely polarizing optical system.
Figure 2B:
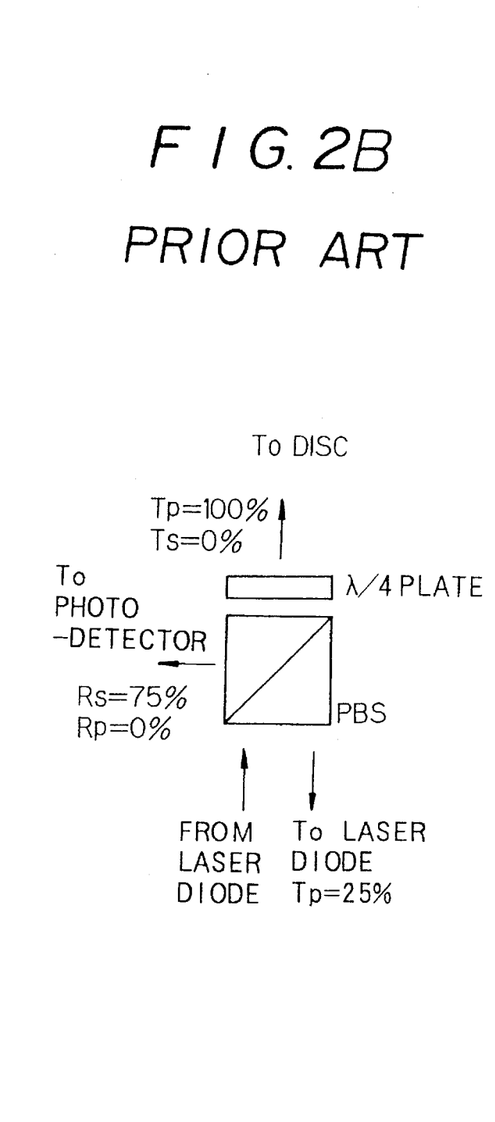
Figure 2C:
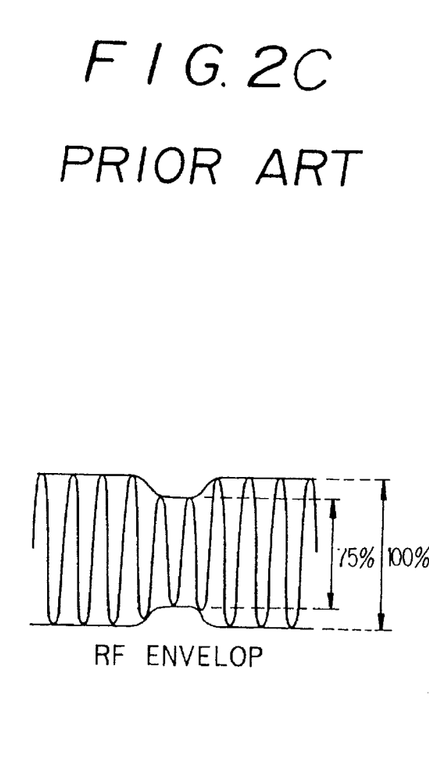
FIG. 2C is a diagram illustrating an envelop of RF signal detected by photodetector.

An optical system of optical pickup utilizing completely polarizing optical system is shown in FIGS. 2A and 2B. FIG. 2A illustrates a case where optical disc has no double refraction, and FIG. 2C illustrates a case where optical disc has double refraction whose phase contrast is 60 [deg]. An optical pickup utilizing non-polarizing optical system generally satisfies the following conditions:

Tp=100 [%],

Rs=100 [%],

TS=0 [%], and

Rp=0 [%].

Figure 8:
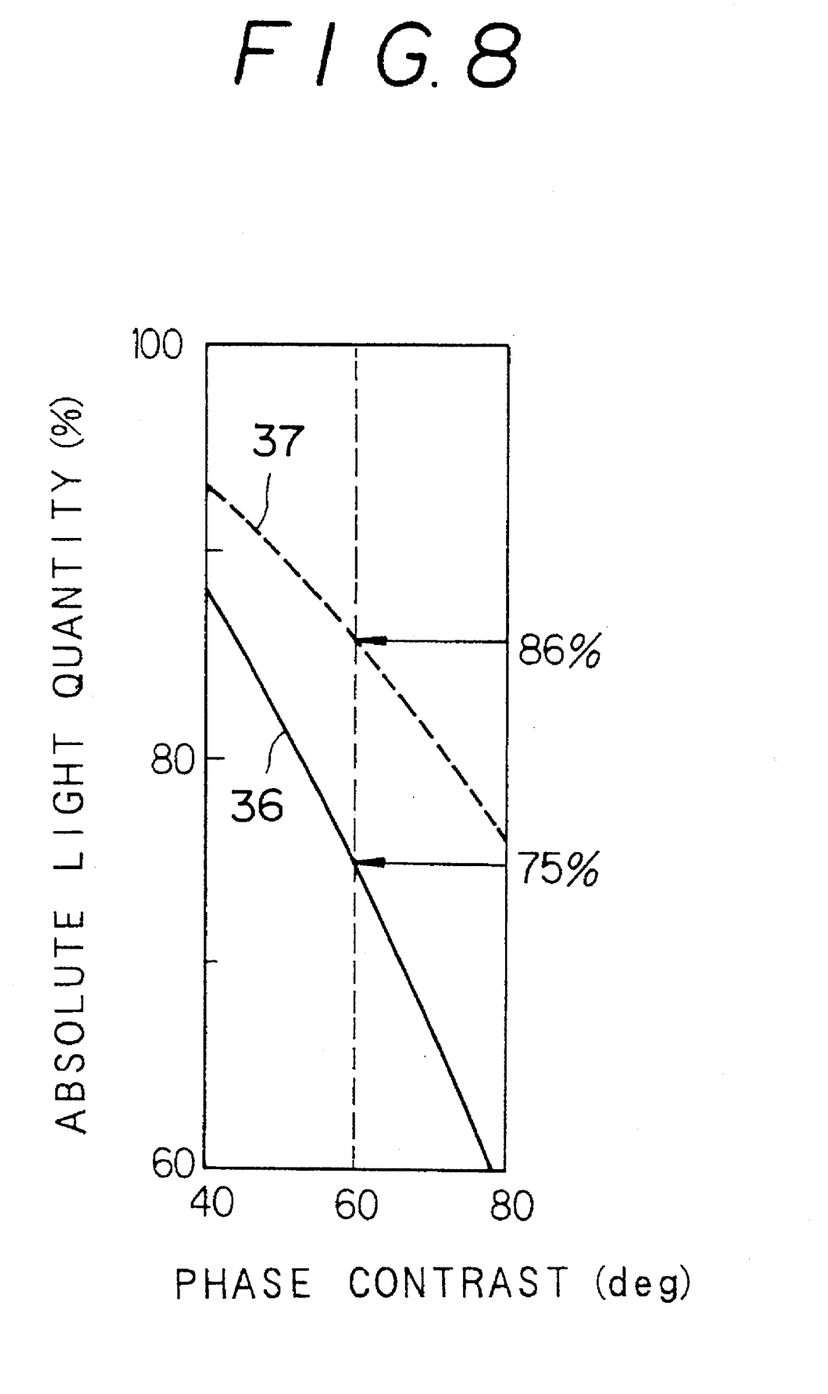
FIG. 8 is a partially-enlarged view of FIG. 7

As illustrated in FIG. 2A, when optical disc has no double refraction, a light incident upon photodetector includes 100% of reflected light of s-polarization and 0% of reflected light of p-polarization. Namely, substantially 100% of light emitted by laser diode is incident upon the photodetector. In contrast, as illustrated in FIG. 2B, when optical disc has double refraction whose phase contrast is 60 [deg], a light incident upon photodetector includes 75% of reflected light of s-polarization (see. FIG. 8), and 25% of light returns to the laser diode. FIG. 2C illustrates quantity of light incident upon photodetector utilizing envelop of RF signal detected.

The optical pickup utilizing non-polarizing optical system has such an advantage that it is not affected by double refraction of material constituting the optical disc. However, the optical disc utilizing non-polarizing optical system has such disadvantages that laser diode becomes noisy because large quantity of light returns thereto, and that light quantity of light incident upon photodetector is small. Particularly, a high-output laser diode is more largely affected by the return light than a low-output laser diode for reproduction only, because the high-output laser diode has small end-face reflectance so as to increase the output power. Further, in a case of optical discs requiring high recording power, such as LDR (Laser Disc Recordable), in which disc is rotated at high speed although reflectance is set relatively low (approximately 40 [%]) for decreasing recording power, it is necessary to ensure high efficiency of optical pickup and to increase incident light quantity of photodetector at the same time. Therefore, it is difficult to apply an optical pickup utilizing non-polarizing optical system to such optical discs.

On the other hand, an optical pickup utilizing completely polarizing optical system has such an advantage that laser diode is less noisy and large quantity of light is incident upon photodetector because all of light from the optical disc is reflected to the photodetector by the polarization prism. However, optical pickup utilizing completely polarizing optical system has such an disadvantage that it is affected by double refraction of material constituting the optical disc. More specifically, light emitted by the laser diode includes 100% of p-polarized light and, if the optical disc has no double refraction, the light is irradiated on the optical disc after passing through the ¼-wave plate, is reflected by the optical disc and is changed to 100% s-polarized light by again passing through the ¼-wave plate. As a result, all component of light reflected by the optical disc is reflected by the polarization prism to the photodetector side. In contrast, when the optical disc has double refraction, light reflected by the optical disc becomes elliptically polarized light, and the p-polarization component of which returns to the photodetector after passing through the polarization prism. As a result, noise of the laser diode increases and light quantity incident to the photodetector decreases.

Further, in actuality, EIAJ standard of Laser Disc prescribes that phase contrast of refracted lights by double refraction due to optical disc material should be no more than 40 [deg], and Red Book standardizing format of Compact Disc prescribes that phase contrast of refracted lights by double refraction due to optical disc material should be no more than 46 [deg]. Under these conditions, optical pickup utilizing completely polarizing optical system raises the above mentioned problems. As described above, optical pickups of non-polarizing type and completely polarizing type have both merits and demerits, respectively, and either of them is selectively used to make the best use of its merits.

As an optical pickup for use in recording is required to satisfy both merits of the above-described pickups of two types, however, a conventional optical pickup does not meet this requirement. In this view, it is conceivable to increase efficiency of pickup for ensuring enough laser power for recording, and to increase laser power to compensate for lack of light quantity incident to the photodetector in reproduction. However, a recordable optical disc such as LDR has limit in reproduction laser power and, when the laser power is too high, recorded information may be destroyed. Therefore, such an optical pickup cannot be used for recording.

SUMMARY OF THE INVENTION

It is an object of the present invention to provide an optical pickup which has less noise in laser diode and is capable of supplying large quantity of light to photodetector without destroying recorded information, thereby stabilizing information reproduction.

According to one aspect of the present invention, there is provided an optical pickup including: a laser diode for emitting p-polarized light, the laser diode having unit for controlling output power of the p-polarized light by detecting power of the emitted light in front thereof; a photodetector for receiving a laser light and outputting a signal corresponding to quantity of the laser light received; a polarization prism for transmitting and guiding the emitted light to an optical disc on which information is recorded by applying heat thereon, and for reflecting and guiding at least a portion of the light reflected by the optical disc to the photodetector. The optical pickup substantially satisfies the following conditions:

$((RP_{MIN}/LDP_{MAX})/OP_{LOSS}) \times 100 \leq Tp$ [%], $(LP_{MON}/LDP) \times 100 \leq Rp$ [%], $(PP_{MIN}/(PP_{MAX} \times R\alpha)) \times 100 \leq Rs$ [%], Rp=100−Tp [%], and Ts=100−Rs, wherein p-polarized light transmittance of the polarization prism is Tp [%], s-polarized light transmittance of the polarization prism is Ts [%], p-polarized light reflectance of the polarization prism is Rp [%], s-polarized light reflectance of the polarization prism is Rs [%], maximum output power of the laser diode is $LDP_{MAX}$ [mW], minimum recording power of the optical disc is $RP_{MIN}$ [mW], estimated loss factor of optical system of the optical pickup is $OP_{LOSS}$, light quantity detected by the output power control unit is $LP_{MON}$ [mW], normal output power of the laser diode is LDP [mW], maximum power of light irradiated on the optical disc during reproduction is $PP_{MAX}$ [mW], reflectance of the optical disc is Rα [%] and minimum power of light irradiated on the optical disc during reproduction is $PP_{MIN}$ [mW].

According to another aspect of the present invention, there is provided an optical pickup including: a laser diode for emitting p-polarized light, the laser diode having unit for controlling output power of the p-polarized light by detecting power of the emitted light in front thereof; a photodetector for receiving a laser light and outputting a signal corresponding to quantity of the laser light received; a polarization prism for transmitting and guiding the emitted light to an optical disc on which information is recorded by applying heat thereon, and for reflecting and guiding at least a portion of the light reflected by the optical disc to the photodetector. The optical pickup substantially satisfies the following conditions:

60 [%] ≤ Tp ≤ 90 [%],

14 [%] ≤ Rs [%],

Rp=100−Tp [%], and

Ts=100−Rs, wherein p-polarized light transmittance of the polarization prism is Tp [%], s-polarized light transmittance of the polarization prism is Ts [%], p-polarized light reflectance of the polarization prism is Rp [%] and s-polarized light reflectance of the polarization prism is Rs [%].

The nature, utility, and further features of this invention will be more clearly apparent from the following detailed description with respect to preferred embodiment of the invention when read in conjunction with the accompanying drawings briefly described below.

DESCRIPTION OF THE PREFERRED EMBODIMENT

A preferred embodiment of the present invention will be described below with reference to the accompanying drawings.

Figure 3:
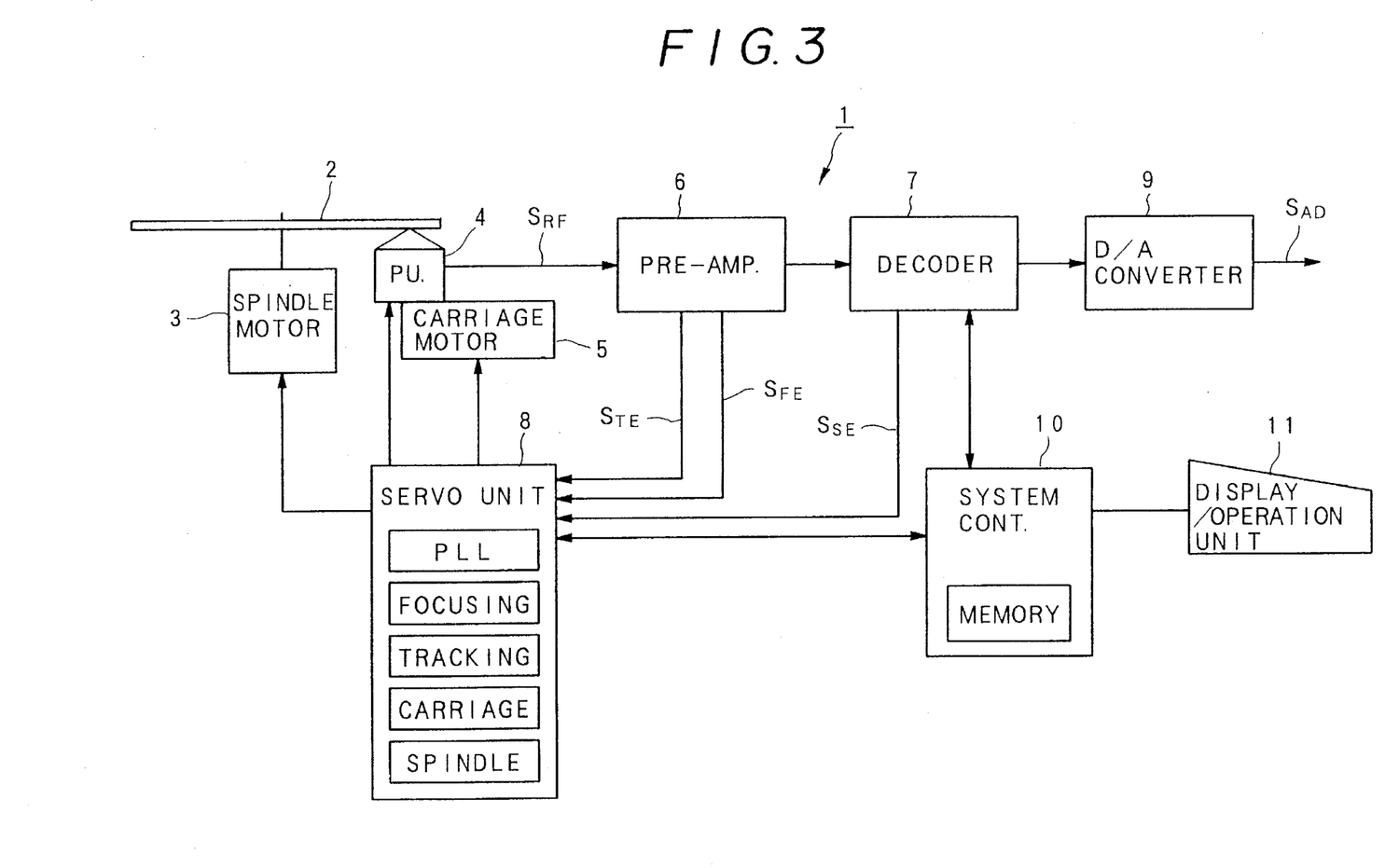
FIG. 3 is a block diagram illustrating a construction of optical disc reproducing apparatus according to the present invention.

FIG. 3 illustrates a construction of optical disc reproducing apparatus according to the present invention. An optical disc reproducing apparatus 1 rotates an optical disc 2 by means of a spindle motor 3. A pickup 4 is moved in a radial direction of the disc by a carriage motor 5, reads out information recorded on the optical disc 2 to produce RF (Radio Frequency) signal $S_{RF}$ and supplies it to a pre-amplifier 6. The pre-amplifier 6 amplifies the RF signal $S_{RF}$ to be supplied to a decoder 7 and produces focusing error signal $S_{FE}$ and tracking error signal $S_{TE}$ to be supplied to a servo unit 8. The decoder 7 converts the RF signal $S_{RF}$ into binary signal, eliminates synchronizing signals and performs EFM demodulation to supply demodulated signal to a D/A converter 9, and generates spindle error signal $S_{SE}$ to be supplied to the servo unit 8. The spindle servo circuit of the servo unit 8 controls rotation frequency of the spindle motor 3 by means of PLL circuit so that linear velocity or angular velocity of the rotation becomes constant. In addition, the servo circuit 8 controls position of an objective lens in the pickup 4 by focusing servo circuit, drives the objective lens finely in the radial direction of the optical disc 2 by tracking servo circuit, and maintains the objective lens at information reading position of a given track. Further, the servo unit 8 drives the carriage motor 5 by means of carriage servo circuit to transfer the pickup to a certain radial position of the optical disc 2, and let it stay there. The D/A converter 9 converts data supplied from the decoder 7 into an analog signal $S_{AD}$ and outputs it. The system controller 10 has memory for storing various data, and totally controls the performance of the optical disc reproducing apparatus 1. A display/operation unit 11 displays condition of the apparatus 1, reproduction order of information, etc., and receives input of various information from user.

Figure 4:
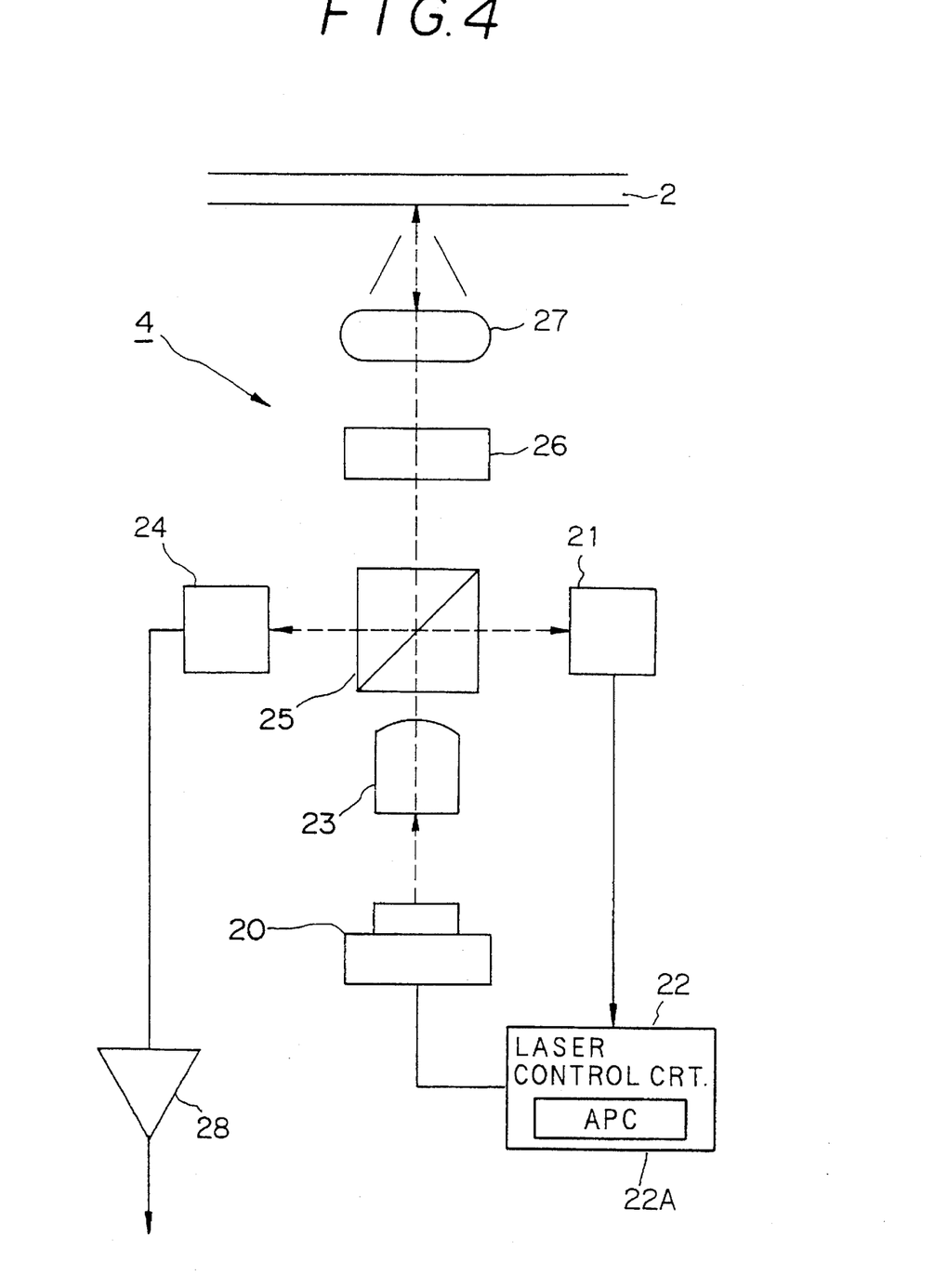
FIG. 4 is a diagram illustrating an optical system of optical pickup shown in FIG. 3.

FIG. 4 illustrates an optical system of the pickup 4. The pickup 4 includes a laser diode 20, a first photodetector 21, a laser control circuit 22, a collimator lens 23, a polarization prism (PBS) 25, a ¼-wave plate 26, an objective lens 27, a second photodetector 24 and an amplifier 28. The laser diode 20 emits a laser light, and the first photodetector 21 monitors the outputted laser light at the front thereof and outputs detection signal. The laser control circuit 22 includes an automatic power control circuit (APC) 22A and controls power of the laser light emitted by the laser diode 20. The collimator lens 23 converts the laser light emitted by the laser diode 20 into a convergent light. The PBS 25 guides the convergent light to the optical disc side, guides front-monitoring laser light to the first photodetector 21, and guides the light reflected by the optical disc 2 to the second photodetector 24. The ¼-wave plate 26 produces optical path difference of ¼ wave for mutually converting s-polarized light and p-polarized light, and the objective lens 27 converges the laser light from the ¼-wave plate 26 on the optical disc 2. The second photodetector 24 receives the light reflected by the optical disc 2 and guided by the PBS 25, and converts it into an electric signal to be outputted. The amplifier 28 amplifies the output signal of the second photodetector 24 and outputs it as a reproduced RF signal.

Next, optical characteristics of the PBS will be described.

(1) Decision of Transmittance Tp

Firstly, lower limit of the transmittance Tp will be examined. Maximum output power of laser diode currently in practical use is approximately 60 mW. Assuming that recording power of optical disc requires at least 25 mW, pickup efficiency (=transmittance Tp of p-polarized light) is required to be at least:

25/60=41.7 [%].

In addition to this, loss of laser power due to optical elements, and eclipse efficiency of the collimator lens and beam dividing ratio should be estimated. For example, assuming that the loss due to optical element is 15 [%], ratio of main beam in three-beams is 83 [%] and other factors can be neglected, the transmittance Tp of p-polarized light at the PBS is required to be no less than 59.1 [%]. In practice, other factors affect the power of the laser beam and the loss due to the optical elements varies, it is necessary to decide the transmittance Tp to be no less than 60 [%].

Figure 5:
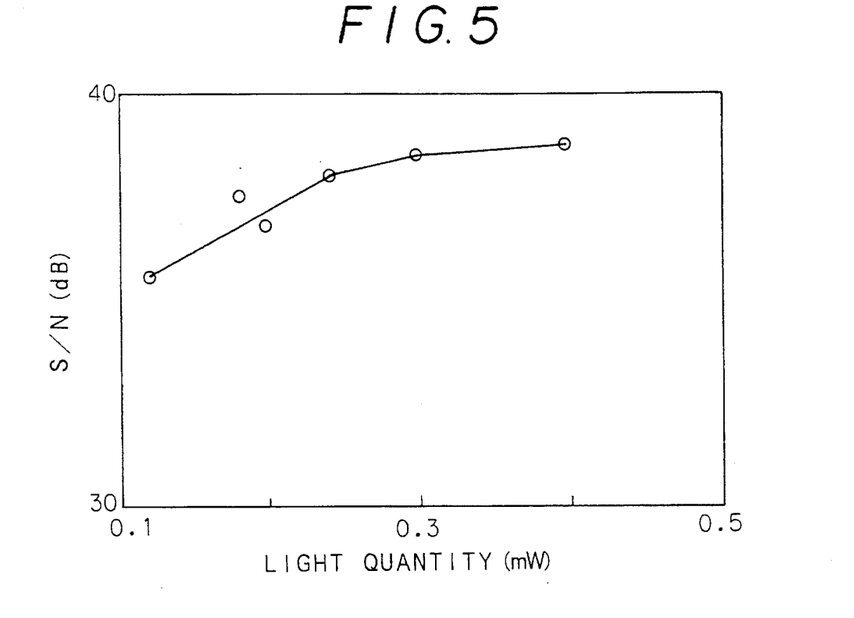
FIG. 5 is a graph illustrating a relationship between quantity of light incident on photodetector and S/N ratio.

Next, upper limit of the transmittance Tp will be examined. In the optical pickup 4, output power of the laser diode 20 is monitored in front of it by the first photodetector 21, in order to accurately detect output power thereof at the time of recording and reproducing and to stabilize the control by the laser control circuit 22A. This is referred to as "front monitoring method". In order to accurately detect output power by the front monitoring method, an S/N ratio is required to be more than a certain level. In this view, relationship between quantity of light incident to the first photodetector 21 and S/N ratio (C/N ratio:Carrier to Noise ratio) will be examined. FIG. 5 illustrates a relationship between quantity of light incident to the first photodetector 21 and S/N ratio. FIG. 5 teaches that as the light quantity increases, the S/N ratio is improved.

Figure 6:
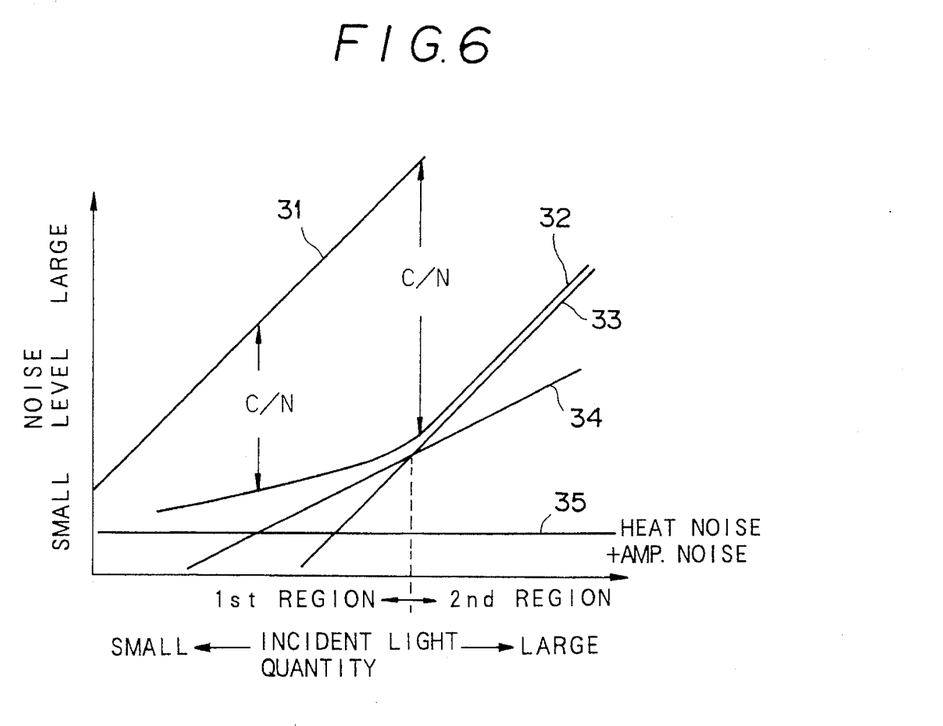
FIG. 6 is a graph illustrating levels of various noises generated in an optical disc system.

Noise generated in optical disc system can be classified into the following three groups:

1) heat noise or amplifier noise which is constant and independent of quantity of light incident upon photodetecting element, 2) disc noise or laser diode noise which is proportional to quantity of light incident upon photodetecting element, and 3) shot noise (detector noise) which is proportional to a square-root of light quantity incident upon photodetecting element. FIG. 6 is a diagram illustrating levels of these noises obtained by theoretical calculation. In FIG. 6, line 31 represents signal level, line 32 represents total noise, line 33 represents disc or laser diode noise, line 34 represents shot noise and line 35 represents heat noise and amplifier noise. As seen from FIG. 6, shot noise 34 (proportional to a square-root of light quantity) is dominant in the first region where incident light quantity is small. In this region, as the light quantity increases, increasing rate of shot noise is reduced and hence C/N ratio is improved. However, in the second region where incident light quantity is larger, disc noise and laser diode noise (proportional to incident light quantity) are dominant and total noise becomes proportional to the light quantity. Therefore, in this second region, C/N ratio is constant and is not improved by increasing incident light quantity. Namely, even if the incident light quantity is increased, improvement of S/N ratio has a certain limitation.

Accordingly, assuming that incident light quantity of the first photodetector is required to be no less than 0.15 mW for correctly detecting output power of laser diode, based on FIGS. 5 and 6, by the from monitoring method, necessary p-polarized light reflectance Rp should satisfy:

$Rp \geq 10$ [%], under the condition that output power of the laser diode is 1.5 mW. If absorption of light by PBS is neglected, Tp=100−Rp [%], and therefore, $Tp \leq 90$ [%].

(2) Decision of Transmittance Ts

Firstly, lower limit of transmittance Ts will be examined. When laser diode noise is large, recording and reproduction of information is affected by the noise. A laser diode currently in practical use for recording has a characteristic that when quantity of return light from the optical disc exceeds 10 [%], laser diode noise rapidly increases. Namely, when the light quantity of return light from the optical disc is lower than 10 [%], recording and reproduction is free from affection by noise. Accordingly, the following examination is directed as to how the return light quantity from the optical disc is suppressed to be lower than 10 [%].

Assuming that reflectance of optical disc is $R\alpha$, double refraction is $\delta$, p-polarized light component emission intensity of laser diode is $I_0$, p-polarization transmittance of PBS is Tp, s-polarization transmittance of PBS is Ts, p-polarization reflectance of PBS is Rp and s-polarization reflectance of PBS is Rs, incident light intensity I of optical disc is expressed by:

$I = Tp \cdot I_0$, and p-polarized component and s-polarized component of return light from the optical disc are expressed by:

p-polarized component: $SIN^2(\delta/2) \cdot R\alpha \cdot Tp \cdot I_0$, and s-polarized component: $COS^2(\delta/2) \cdot R\alpha \cdot Tp \cdot I_0$.

Accordingly, p-polarized component and s-polarized component of return light again passing the PBS toward the laser diode are expressed by:

p-polarized component: $Tp \cdot SIN^2(\delta/2) \cdot R\alpha \cdot Tp \cdot I_0$, and s-polarized component: $Ts \cdot COS^2(\delta/2) \cdot R\alpha \cdot Tp \cdot I_0$.

Therefore, total quantity $I_{LD}$ of return light to the laser diode is expressed by:

$$I_{LD} = Tp \cdot SIN^2(\delta/2) \cdot R\alpha \cdot Tp \cdot I_0 + Ts \cdot COS^2(\delta/2) \cdot R\alpha \cdot Tp \cdot I_0.$$

Accordingly, return light quantity $I_{LDO}$ to the laser diode in a case where double refraction $\delta=0$ [deg] is expressed by:

$$I_{LDO} = Ts \cdot R\alpha \cdot Tp \cdot I_0,$$

and return light quantity $I_{LD60}$ to the laser diode in a case where double refraction $\delta=60$ [deg] is expressed by:

$$I_{LD60}=Tp \cdot (\frac{1}{4}) \cdot R\alpha \cdot Tp \cdot I_0 + Ts \cdot (\frac{3}{4}) \cdot R\alpha \cdot Tp \cdot I_0 = (\frac{1}{4}) \cdot R\alpha \cdot Tp \cdot I_0 \cdot (3 \cdot Ts + Tp).$$

Accordingly, in order to suppress variation of return light quantity $I_{LD}$ due to double refraction to be no more than 10 [%], $$I_{LD0}/I_{LD60} \leq (100+10)/100,$$

should be satisfied and therefore, $$I_{LD0}/I_{LD60}=(3 \cdot Ts+Tp)/(4 \cdot Ts) \leq 1.1,$$

should be satisfied. By solving this, the following relation is obtained:

$Ts \geq 0.71 \cdot Tp$.

When the lower limit value of p-polarized transmittance Tp (60 [%]$\leq$Tp) is applied to the above relation, 42.6 [%]$\leq$Ts, is obtained, and it is approximated as:

43 [%]$\leq$Ts.

The above examination is directed to a case where double refraction $\delta=60$ [deg]. However, actual double refraction is less than this value and therefore return light quantity $I_{LD}$ to the laser diode is smaller than the above value.

Next, upper limit of the transmittance Ts will be examined. Assuming that upper limit of power of reproduced light, irradiated on the optical disc, which does not destroy recorded information in reproduction is 1.5 mW, lower limit of power of reproduced light at the second photodetector is 0.15 mW and reflectance of optical disc is 70 [%], only s-polarized light component of return light from the optical disc is guided to the second photodetector. Accordingly, conditions of reflectance Rs and transmittance Ts are as follows:

$0.15 \leq 1.5 \times 0.7 \times Rs$,

14 [%]$\leq$Rs, and accordingly,

86 [%]$\geq$Ts.

As a result of the above examinations, ranges of the p-polarized light transmittance Tp, s-polarized light transmittance Ts, p-polarized light reflectance Rp and s-polarized light reflectance Rs of PBS are expressed as follows:

60 [%]$\leq$Tp$\leq$90 [%],

14 [%]$\leq$Rs$\leq$57 [%],

43 [%]$\leq$Ts$\leq$80 [%], and

10 [%]$\leq$Rp$\leq$40 [%].

Next, optical characteristics of PBS will be examined in more detail. Now, quantity of light emitted by the laser diode and guided to the second photodetector 24 and quantity of light returns to the laser diode 20 will be calculated using Jones-vector. Electric field component [$E_X$, $E_Y$] of laser light incident upon the optical disc is expressed as (provided that $j^2=-1$):

$$\begin{bmatrix} E_X \\ E_Y \end{bmatrix} = \begin{bmatrix} \cos\theta_1 \\ \sin\theta_1 \end{bmatrix} E_0 e^{j\omega t} \quad (1)$$

In this case, assuming that the optical disc has double refraction $\delta$, electric field component [$E_{X1}$, $E_{Y1}$] of light reflected by the optical disc is expressed as:

$$\begin{bmatrix} E_{X1} \\ E_{Y1} \end{bmatrix} = \begin{bmatrix} \exp(j\delta/2) & 0 \\ 0 & \exp(j\delta/2) \end{bmatrix} \begin{bmatrix} E_X \\ E_Y \end{bmatrix} \quad (2)$$

Electric field component [$E_{X2}$, $E_{Y2}$] in consideration of ¼-wave plate (i.e., rotation matrix of 45 [deg] is added) is expressed as:

$$\begin{bmatrix} E_{X2} \\ E_{Y2} \end{bmatrix} = \frac{1}{\sqrt{2}} \begin{bmatrix} 1 & -1 \\ 1 & 1 \end{bmatrix} \begin{bmatrix} \exp(j\delta/2) & 0 \\ 0 & \exp(j\delta/2) \end{bmatrix} \times \quad (3)$$

$$\frac{1}{\sqrt{2}} \begin{bmatrix} 1 & 1 \\ -1 & 1 \end{bmatrix} \begin{bmatrix} E_X \\ E_Y \end{bmatrix}$$

By calculating the equation (3), the following equation is obtained:

$$\begin{bmatrix} E_{X2} \\ E_{Y2} \end{bmatrix} = \begin{bmatrix} \exp(j\delta/2) & 0 \\ 0 & \exp(j\delta/2) \end{bmatrix} \begin{bmatrix} E_X \\ E_Y \end{bmatrix} \quad (4)$$

and electric field component [$E_{X3}$, $E_{Y3}$] of reflected light in a case where the double refraction of the optical disc is oriented to a direction rotated by $\theta_2$ from both X-axis and Y-axis is expressed as:

$$\begin{bmatrix} E_{X3} \\ E_{Y3} \end{bmatrix} = \begin{bmatrix} \cos\theta_2 & \sin\theta_2 \\ -\sin\theta_2 & \cos\theta_2 \end{bmatrix} \begin{bmatrix} E_{X2} \\ E_{Y2} \end{bmatrix} \quad (5)$$

If the pickup is oriented to a direction where the PBS is most largely affected by the double refraction of the optical disc, the relationship: $\theta_1=\theta_2=\pi/4$ holds. By applying the equations (1) and (4) to the equation (5), the following equation is obtained:

$$\begin{bmatrix} E_{X3} \\ E_{Y3} \end{bmatrix} = \begin{bmatrix} \cos\delta/2 \\ \sin\delta/2 \end{bmatrix} E_0 e^{j\omega t} \quad (6)$$

When each of the above components $E_X$ and $E_Y$ is expressed by power components $I_{X3}$ and $I_{Y3}$, the component [$I_{X3}$, $I_{Y3}$] can be expressed as (provided that $(I_0)^2=E_0$):

$$\begin{bmatrix} I_{X3} \\ I_{Y3} \end{bmatrix} = \begin{bmatrix} [E_X]^2 \\ [E_Y]^2 \end{bmatrix} = \begin{bmatrix} \cos^2(\delta/2) \\ \sin^2(\delta/2) \end{bmatrix} I_0 \quad (7)$$

This equation (7) teaches that the quantity of light reflected by the optical disc is a function of the double refraction of optical disc substrate.

Next, quantity $I_{PD}$ of light received by the second photodetector and quantity $I_{LD}$ of light return to the laser diode will be obtained in consideration of factor of PBS. The received light quantity $I_{PD}$ is quantity of light reflected by the PBS and the return light quantity $I_{LD}$ is quantity of light transmitted through the PBS, and therefore the quantities $I_{PD}$ and $I_{LD}$ are expressed as follows using the p-polarized light transmittance Tp [%], the s-polarized light transmittance Ts [%], p-polarized light reflectance Rp [%] and s-polarized light reflectance Rs [%]:

$$\begin{bmatrix} I_{PD} \\ I_{LD} \end{bmatrix} = \frac{1}{100} \begin{bmatrix} R_S & R_P \\ T_S & T_P \end{bmatrix} \begin{bmatrix} \cos^2(\delta/2) \\ \sin^2(\delta/2) \end{bmatrix} I_0 \quad (8)$$

Figure 7:
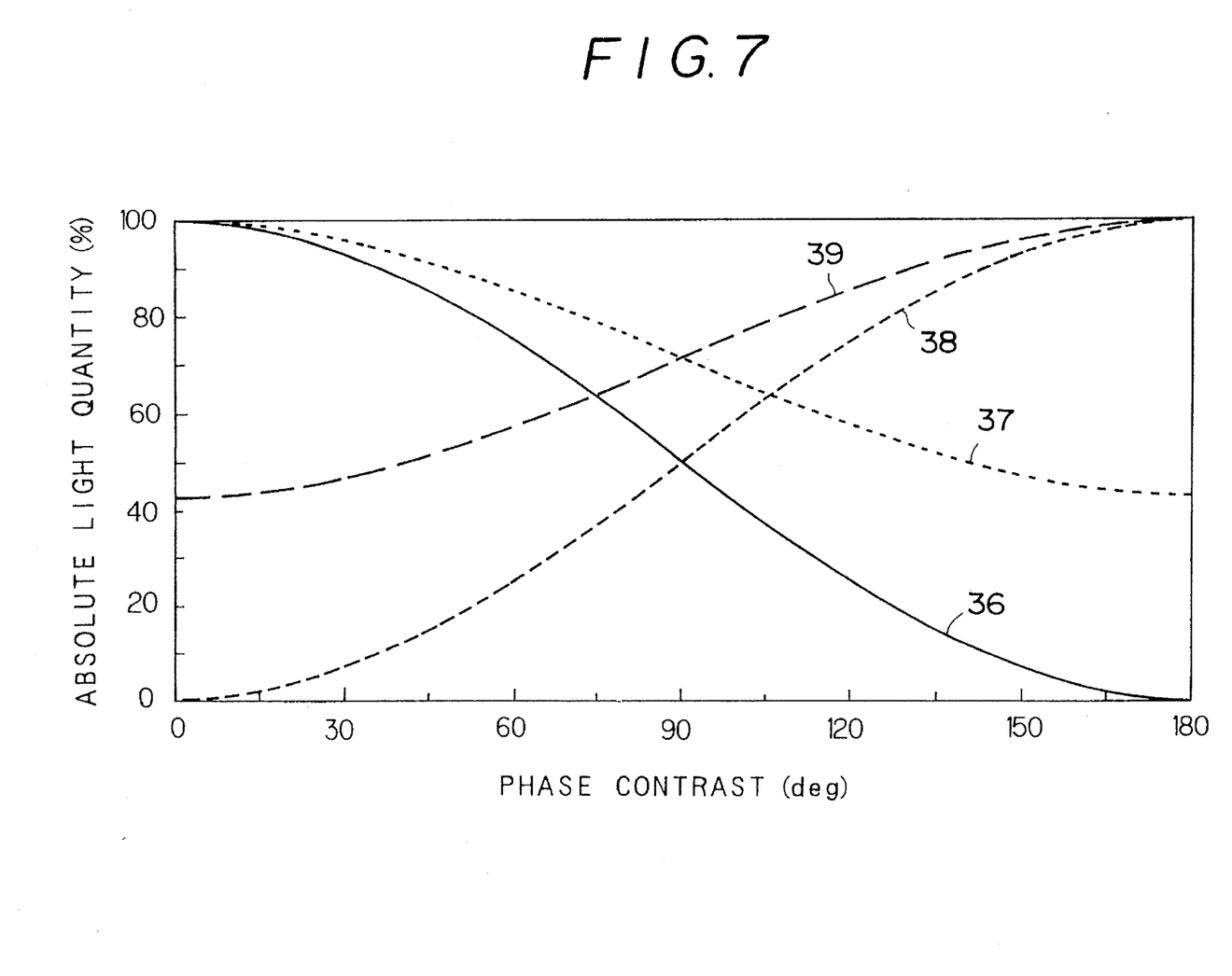
FIG. 7 is a graph illustrating quantities of lights received by photodetector and returning to laser diode.

By applying the values Ts (=Rp=0 [%]) and Tp (=Rs=100 [%]) to the equation (8), light quantities $I_{PD}$ and $I_{LD}$ of completely polarizing optical system are obtained, and by applying the values Ts (=Tp) and Rs (=Rp) to the equation (8), light quantities $I_{PD}$ and $I_{LD}$ of non-polarizing optical system are obtained. FIG. 7 illustrates received quantities $I_{PD}$ and return light quantity $I_{LD}$ calculated, according to the equation (8), for the polarizing optical system according to the present invention and a conventional completely polarizing optical system. In FIG. 7, line 36 represents light quantity $I_{PD}$ of received light according to the conventional optical system, line 37 represents light quantity $I_{PD}$ of received light according to the optical system of the present invention, line 38 represents quantity $I_{LD}$ of return light according to the conventional optical system and line 39 represents quantity $I_{LD}$ of return light according to the optical system of the present invention. FIG. 8 is a partially-enlarged view of FIG. 7. Values illustrated in FIGS. 7 and 8 are calculated under a condition where optical characteristics of PBS in polarizing optical system of the present invention is assumed as follows:

Tp=Rs=70 [%], and Ts=Rp=30 [%].

In FIGS. 7 and 8, the horizontal axis represents phase contrast ([deg]) of two refracted lights, and the vertical axis represents an absolute light quantity obtained when maximum value ($=I_0$) of the quantity of received light $I_{PD}$ is assumed to be 100 [%]. It is noted that, in the calculation, only effects of double refraction are considered and attenuations due to reflection of light by the optical disc is neglected. As seen from FIG. 7, the conventional completely polarizing optical system receives only the s-polarized light by the photodetector, and therefore received light quantity varies within the range of 0 [%]–100 [%]. On the contrary, the polarizing optical system according to the present invention can receive both of the p-polarized light and the s-polarized light of reflected light whose dependencies on the double refraction is different from each other, and therefore received light quantity of the photodetector ranges 40 [%]–100 [%]. In this view, it is unnecessary to increase amplitude of amplifier which amplifies output signal of the photodetector, and thereby the system is free from effects of noise and is stabilized.

Figure 9:
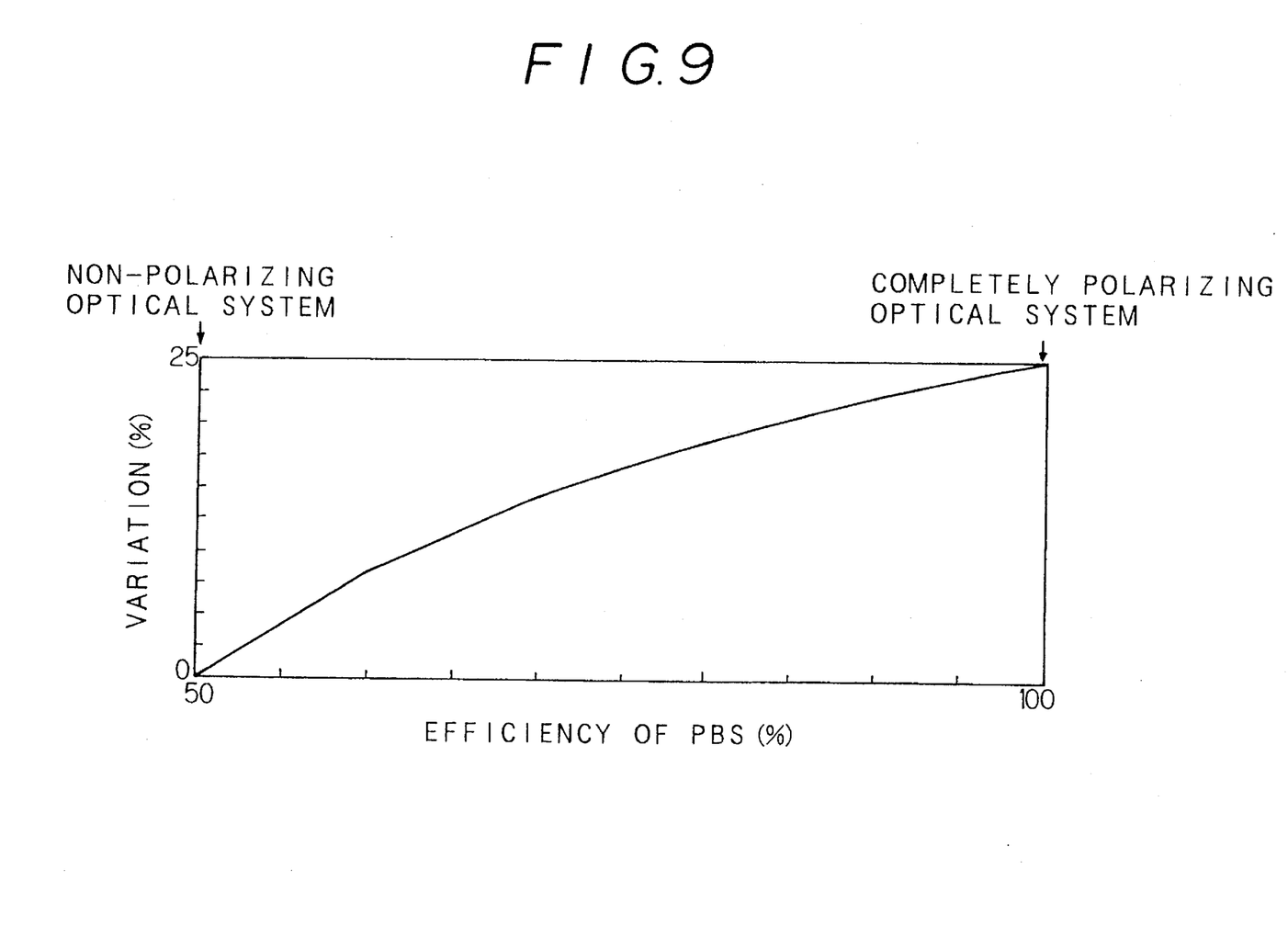
FIG. 9 is a graph illustrating variation of light quantity received by photodetector according to variation of efficiency of PBS.

Next, a case where the efficiency of the PBS (=Tp) is varied will be examined. FIG. 9 illustrates variation of the received light quantity $I_{PD}$ according to the variation of the efficiency of the PBS in the case where the double refraction of the optical disc is 60 [deg]. In FIG. 9, light quantity $I_{PD}$ of received light when the optical disc has no double refraction (double refraction=0 [deg]) is assumed to be 100 [%]. In this case, the following equation holds:

$$Rp = Ts = 100 - Tp \ [\%].$$

Here, assuming that $I_0=1$, the following equation is obtained using the equation (8):

$$I_{PD} = \{Rs \cdot \cos^2(\delta/2) + Rp \cdot \sin^2(\delta/2)\}/100 \quad (9)$$
$$= \{Rs \cdot \cos^2(\delta/2) + (100-Rs) \cdot \sin^2(\delta/2)\}/100$$

Using the equation (9), light quantity $I_{0deg}$ of received light when the double refraction $\delta=0$ and light quantity $I_{60deg}$ of received light when the double refraction $\delta=60$ are obtained as follows:

$$I_{0deg} = Rs/100 \quad (10)$$
$$I_{60deg} = \{0.75Rs + 0.25 \cdot (100-Rs)\}/100 \quad (11)$$
$$= \{0.5Rs + 25\}/100.$$

FIG. 9 illustrates a ratio, in percentage, of a difference (reduced component) between light quantity $I_{0deg}$ and light quantity $I_{60deg}$ to the maximum value $I_0$ of the received light. This is represented as follows:

$$(I_{0deg} - I_{60deg})/I_0 = 0.5 - 25/Rs \quad (12).$$

In FIG. 9, the case where the efficiency of the PBS is 50 [%] corresponds to the conventional non-polarizing optical system, and the case where the efficiency is 100 [%] corresponds conventional completely polarizing optical system. Namely, between the non-polarizing optical system and the completely polarizing optical system, the ratio of the difference between light quantity $I_{0deg}$ and light quantity $I_{60deg}$ to the maximum value $I_0$ varies within the range of 0 [%]–25 [%].

Figure 10:
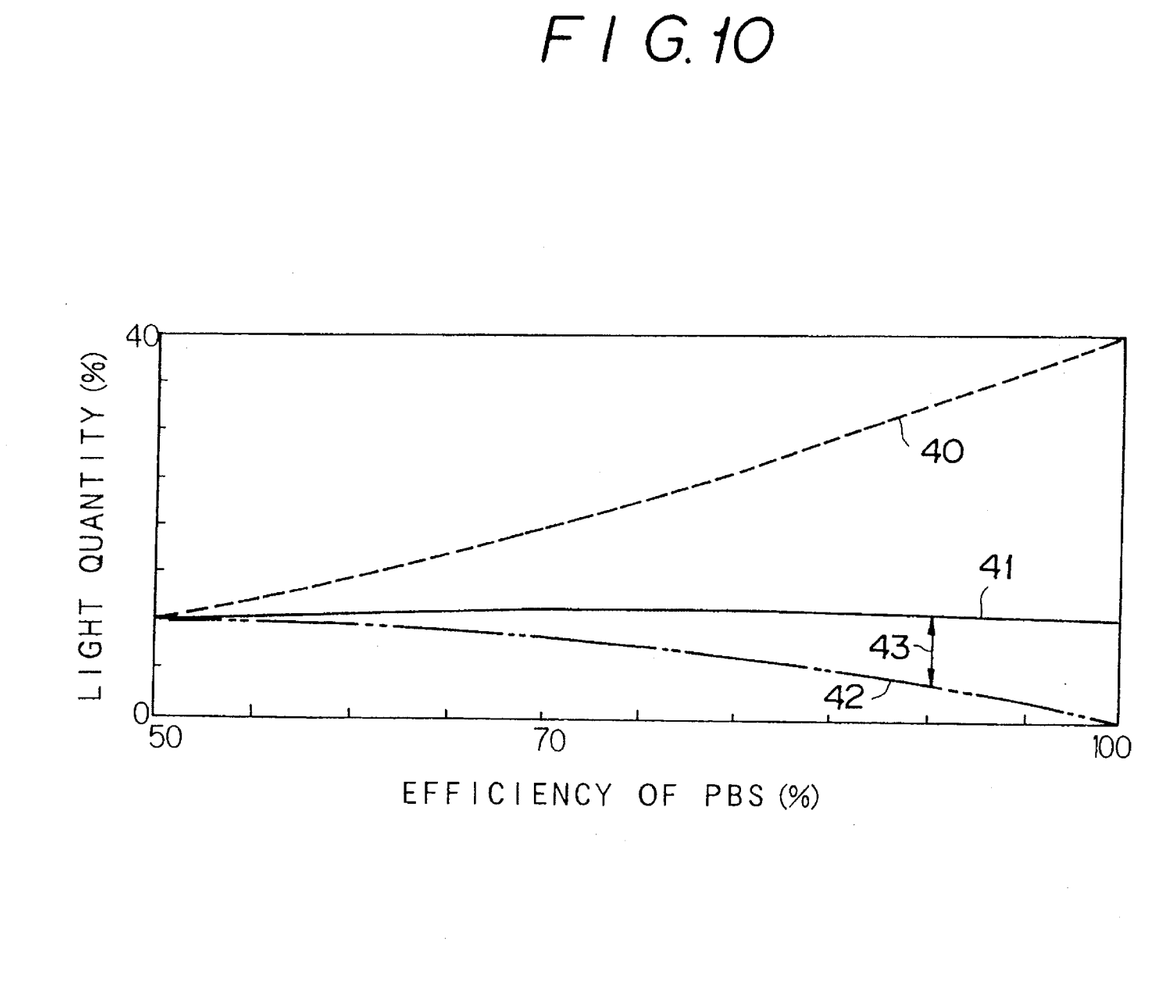
FIG. 10 is a graph illustrating variation of light quantity returning to laser diode according to variation of efficiency of PBS.

Next, relationship between the efficiency of PBS (=Tp) and quantity $I_{LD}$ of return light to the laser diode will be examined. FIG. 10 illustrates variation of light quantity $I_{LD}$ according to the variation of the efficiency of the PBS (=Tp). In FIG. 10, line 40 represents a case of using conventional non-polarizing optical system, line 41 represents a case of using polarizing optical system of the present invention having double refraction $\delta=60$ [deg], and line 42 represents a case using polarizing optical system of the present invention having double refraction $\delta=0$ [deg]. The return light quantity $I_{LD}$ is obtained as follows using the equation (8):

$$I_{LD} = \{Ts \cdot \cos^2(\delta/2) + Tp \cdot \sin^2(\delta/2)\} \cdot I_0/100 \quad (13)$$

Here, assuming that output power of the laser diode is 100 [%], the maximum value $I_0$ of the received light quantity $I_{PD}$ is restricted by the transmittance of the PBS. Since the output light from the laser diode includes 100[%] of p-polarized light, the following equation is obtained:

$$I_0 = Tp \ [\%].$$

In addition, assuming that the reflectance of the optical disc is 40 [%], the equation (13) can be modified as follows:

$$I_{LD} = \{Ts \cdot \cos^2(\delta/2) + Tp \cdot \sin^2(\delta/2)\} \cdot 0.004Tp \ [\%] \quad (14)$$

Since the s-polarization transmittance Ts is equal to the p-polarization transmittance Tp (i.e., Ts=Tp) in the non-polarizing optical system, the return light quantity $I_{LD}$ is obtained as follows:

$$I_{LD} = 0.004Tp^2 \quad (15)$$

In the polarizing optical system of the present invention, assuming that Tp=Rs and Rp=Ts =100–Tp [%], the equation (14) can be modified as follows:

$$I_{LD} = \{Tp \cdot \sin^2(\delta/2) - Tp \cdot \cos^2(\delta/2) + 100 \cdot \cos^2(\delta/2)\} \times 0.004Tp \ [\%] \quad (16)$$

When $\delta=60$ [deg] is applied to the equation (16), as an exemplary case where the optical system has double refraction, the following equation is obtained:

$$I_{LD} = -0.002Tp^2 + 0.3Tp \quad (17).$$

Similarly, when $\delta=0$ [deg] is applied to the equation (16), as an exemplary case where the optical system has no double refraction, the following equation is obtained:

$$I_{LD} = -0.004Tp^2 + 0.4Tp \quad (18).$$

FIG. 10 illustrates the relationships of the return light quantity $L_{LD}$ with respect to the efficiency of the PBS (Tp)

defined by the equations (15), (17) and (18). In FIG. 10, line 40 represents the relationship defined by the equation (15), line 41 represents the relationship defined by the equation (17) and line 42 represents the relationship defined by the equation (18). It is noted that, in FIG. 10, the difference 43 represents variation of light quantity $I_{LD}$ due to the variation of the double refraction. As seen from FIG. 10, it is preferable that the efficiency (=Tp) of the PBS is approximately 70 [%] where the return light quantity $I_{LD}$ is less than 10 [%] and variation of the return light quantity $I_{LD}$ due to the variation of double refraction is relatively small.

Figure 11A:
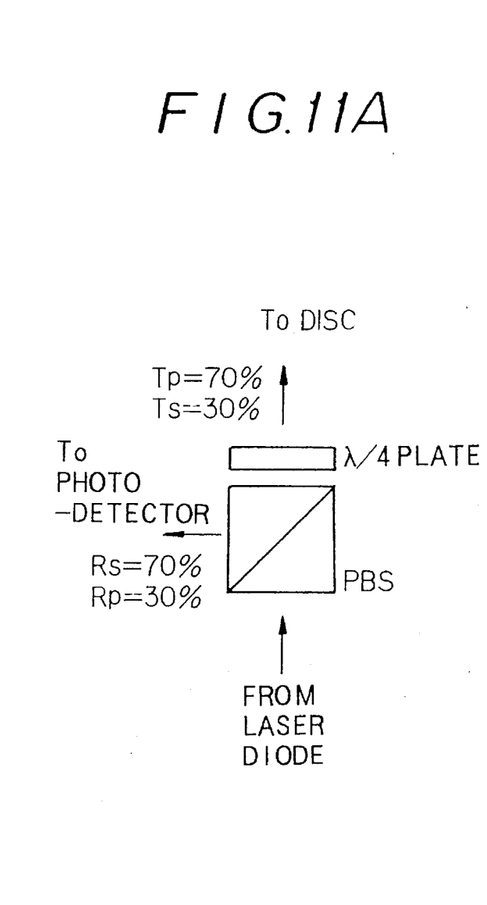
FIGS. 11A and 11B are diagrams illustrating operations of optical pickup according to the present invention.
Figure 11B:
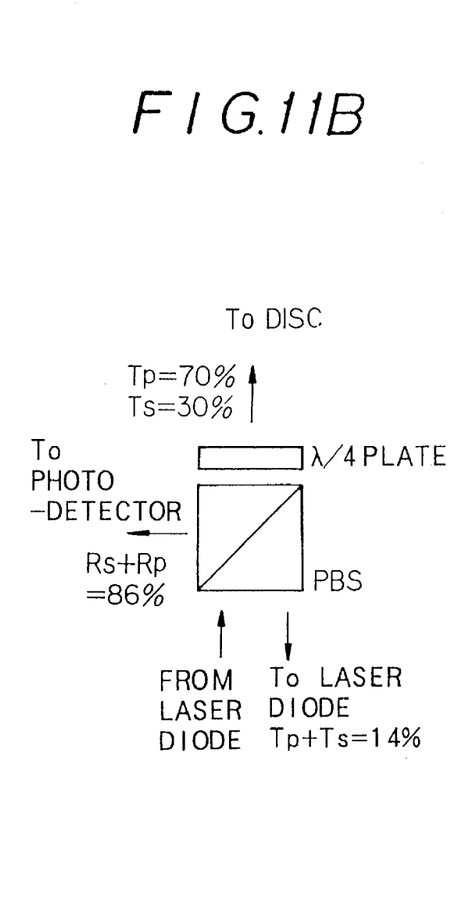
Figure 11C:
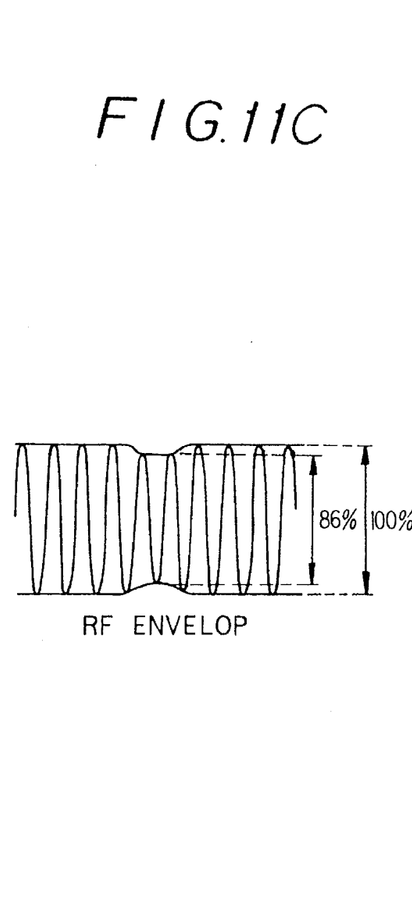
FIG. 11C is a graph illustrating an envelop of RF signal detected by photodetector.

FIGS. 11A and 11B illustrate operation of optical system in which efficiency of PBS is 70 [%]. As illustrated in FIG. 11A, when optical disc has no double refraction, a light incident upon photodetector includes 70 [%] of reflected light of s-polarization and 30 [%] of reflected light of p-polarization. Namely, substantially 100% of light, in total, emitted by laser diode is incident upon the photodetector. In contrast, as illustrated in FIG. 11B, when optical disc has double refraction whose phase contrast is 60 [deg], a light incident upon the second photodetector is 86 [%] (see. FIG. 8) of reflected light of s- and p-polarization, and 14% of light returns to the laser diode. It is noted that the phase contrast of double refraction of optical disc is less than 60 [deg] in practice, and therefore the above values are satisfactory for practical use. FIG. 11C illustrates quantity of light incident upon photodetector utilizing envelop of RF signal detected in order to visualize the variation of the light quantity described above. By comparing these results with those shown in FIGS. 2A to 2C, it is recognized that, according to the optical system of the present invention, light quantity returns to the laser diode is reduced and light quantity received by the photodetector is increased. Thereby, S/N ratio may be improved and recording and reproducing operation may be stabilized.

As described above, according to the present invention, the optical pickup produces output signal on the basis of both p-polarized light and s-polarized light. Therefore, the optical pickup of the invention is hardly affected by double refraction of optical disc and can decrease laser diode noise by reducing light quantity return to the laser diode, thereby stabilizing recording and reproduction.

What is claimed is:

1. An optical pickup comprising:
    a laser diode for emitting p-polarized light, the laser diode comprising unit for controlling output power of the p-polarized light by detecting power of the emitted light in front thereof;
    a photodetector for receiving a laser light and outputting a signal corresponding to quantity of the laser light received;
    a polarization prism for transmitting and guiding the emitted light to an optical disc on which information is recorded by applying heat thereon, and for reflecting and guiding at least a portion of the light reflected by the optical disc to the photodetector, said optical pickup substantially satisfying the following conditions:
    $((RP_{MIN}/LDP_{MAX})/OP_{LOSS}) \times 100 \leq Tp$ [%],
    $(LP_{MON}/LDP) \times 100 \leq Rp$ [%],
    $(PP_{MIN}/(PP_{MAX} \times R\alpha)) \times 100 \leq Rs$ [%],
    Rp=100−Tp [%], and
    Ts=100−Rs, wherein p-polarized light transmittance of the polarization prism is Tp [%], s-polarized light transmittance of the polarization prism is Ts [%], p-polarized light reflectance of the polarization prism is Rp [%], s-polarized light reflectance of the polarization prism is Rs [%], maximum output power of the laser diode is $LDP_{MAX}$ [mW], minimum recording power of the optical disc is $RP_{MIN}$ [mW], estimated loss factor of optical system of the optical pickup is $OP_{LOSS}$, light quantity detected by the output power control unit is $LP_{MON}$ [mW], normal output power of the laser diode is LDP [mW], maximum power of light irradiated on the optical disc during reproduction is $PP_{MAX}$ [mW], reflectance of the optical disc is $R\alpha$ [%] and minimum power of light irradiated on the optical disc during reproduction is $PP_{MIN}$ [mW].

2. An optical pickup according to claim 1, further satisfying the following condition:
    $I_{LD0}/I_{LD}\delta \leq (100+X)/100$,
wherein double refraction of the optical disc is $\delta$, p-polarized light component emission intensity of the laser diode is $I_0$, variation ratio of light quantity returning to the laser diode due to double refraction is X [%], light quantity of light returning to the laser diode in a case where the double refraction $\delta=\delta$[deg] is:

$$I_{LD}\delta = Tp \cdot SIN^2(\delta/2) \cdot R\alpha \cdot Tp \cdot I_0 + Ts \cdot COS^2(\delta/2) \cdot R\alpha \cdot Tp \cdot I_0,$$

and light quantity of light returning to the laser diode in a case where the double refraction $\delta=0$ [deg] is:

$$I_{LD0} = Ts \cdot R\alpha \cdot Tp \cdot I_0.$$

3. An optical pickup comprising:
    a laser diode for emitting p-polarized light, the laser diode comprising unit for controlling output power of the p-polarized light by detecting power of the emitted light in front thereof;
    a photodetector for receiving a laser light and outputting a signal corresponding to quantity of the laser light received;
    a polarization prism for transmitting and guiding the emitted light to an optical disc on which information is recorded by applying heat thereon, and for reflecting and guiding at least a portion of the light reflected by the optical disc to the photodetector, said optical pickup substantially satisfying the following conditions:
    60 [%] $\leq$ Tp $\leq$ 90 [%],
    14 [%] $\leq$ Rs [%],
    Rp=100−Tp [%], and
    Ts=100−Rs,
wherein p-polarized light transmittance of the polarization prism is Tp [%], s-polarized light transmittance of the polarization prism is Ts [%], p-polarized light reflectance of the polarization prism is Rp [%] and s-polarized light reflectance of the polarization prism is Rs [%].

4. An optical pickup according to claim 3, further satisfying the following condition:
    Rs $\leq$ 57 [%].

* * * * *